(12) United States Patent
Matthews et al.

(10) Patent No.: US 10,876,457 B2
(45) Date of Patent: Dec. 29, 2020

(54) METHOD AND SYSTEM FOR REDUCING EMISSIONS FROM AN INTERNAL COMBUSTION ENGINE

(71) Applicant: BAE Systems Controls Inc., Endicott, NY (US)

(72) Inventors: Derek M T Matthews, Apalachin, NY (US); Timothy L. Wells, Endicott, NY (US)

(73) Assignee: BAE Systems Controls Inc., Endicott, NY (US)

( * ) Notice: Subject to any disclaimer, the term of this patent is extended or adjusted under 35 U.S.C. 154(b) by 84 days.

(21) Appl. No.: 15/735,461

(22) PCT Filed: Jun. 10, 2016

(86) PCT No.: PCT/US2016/037076
§ 371 (c)(1),
(2) Date: Dec. 11, 2017

(87) PCT Pub. No.: WO2016/201364
PCT Pub. Date: Dec. 15, 2016

(65) Prior Publication Data
US 2018/0171853 A1    Jun. 21, 2018

Related U.S. Application Data

(60) Provisional application No. 62/174,939, filed on Jun. 12, 2015.

(51) Int. Cl.
*F01N 9/00*        (2006.01)
*F02N 11/04*      (2006.01)
(Continued)

(52) U.S. Cl.
CPC ............. *F01N 9/00* (2013.01); *F01N 3/2013* (2013.01); *F02B 43/10* (2013.01);
(Continued)

(58) Field of Classification Search
CPC combination set(s) only.
See application file for complete search history.

(56) References Cited

U.S. PATENT DOCUMENTS 3,901,213 A    8/1975    Charboneau
5,385,017 A    1/1995    Harada
(Continued)

FOREIGN PATENT DOCUMENTS

DE    102005013707 A1    9/2006

OTHER PUBLICATIONS

EP Search Report, EP16808471, dated Feb. 1, 2019, 8 pages.

*Primary Examiner* — Binh Q Tran
(74) *Attorney, Agent, or Firm* — Scott J. Asmus; Scully Scott Murphy & Presser PC

(57) ABSTRACT

Systems, devices, methods and programs for reducing emissions from engines are provided. For example, one system for reducing emissions from engines comprises a heating controller coupled to an energy storage device (ESD). The heating controller is configured to control a heating element to heat one or more components of an after-treatment system using energy from the ESD under a first condition and to control the heating element to stop heating the one or more components of the after-treatment system when a second condition is satisfied. Additionally, another system for reducing emissions from engines comprises a controller detecting a decrease in a demanded torque from an engine and an ISG. The controller is then configured to operate a clutch to disengage the engine from the ISG, if after removing fuel from the engine, the sensed speed of the engine is above a threshold.

16 Claims, 9 Drawing Sheets

(51) Int. Cl.
   *F01N 3/20* (2006.01)
   *F02D 41/02* (2006.01)
   *F02D 41/14* (2006.01)
   *F02B 43/10* (2006.01)
   *F02N 15/02* (2006.01)
   *F02D 41/00* (2006.01)
   *F02D 41/06* (2006.01)

(52) U.S. Cl.
   CPC ..... *F02D 41/0255* (2013.01); *F02D 41/1494* (2013.01); *F02N 11/04* (2013.01); *F02N 15/022* (2013.01); *F01N 2240/16* (2013.01); *F01N 2550/22* (2013.01); *F01N 2900/08* (2013.01); *F01N 2900/1602* (2013.01); *F01N 2900/1631* (2013.01); *F02B 2043/103* (2013.01); *F02D 41/0027* (2013.01); *F02D 41/062* (2013.01); *F02D 2041/026* (2013.01); *F02D 2200/021* (2013.01); *F02D 2200/0802* (2013.01); *F02D 2200/101* (2013.01); *F02D 2200/1002* (2013.01); *F02D 2200/503* (2013.01); *Y02T 10/12* (2013.01); *Y02T 10/40* (2013.01); *Y10S 903/902* (2013.01)

(56) References Cited

U.S. PATENT DOCUMENTS

| | | | | |
|---|---|---|---|---|
| 5,388,404 | A | * | 2/1995 | Tsumura ............... F01N 3/2013 219/202 |
| 5,447,696 | A | * | 9/1995 | Harada ................. F01N 3/2013 422/108 |
| 5,537,321 | A | * | 7/1996 | Yoshizaki ............ F01N 3/2026 123/179.21 |
| 5,732,550 | A | | 3/1998 | Muramatsu et al. |
| 5,904,902 | A | * | 5/1999 | Matuoka .................. F01N 3/20 422/174 |
| 6,619,034 | B1 | * | 9/2003 | Hilbert ..................... B60K 6/48 60/284 |
| 7,829,048 | B1 | * | 11/2010 | Gonze ............... B01D 53/9454 423/213.2 |
| 9,512,756 | B2 | * | 12/2016 | Boggs ..................... F01N 3/033 |
| 9,599,283 | B2 | * | 3/2017 | Lack ........................ F17C 11/00 |
| 2005/0268596 | A1 | * | 12/2005 | Abe ...................... F01N 3/2013 60/277 |
| 2010/0212294 | A1 | | 8/2010 | Narayanaswamy et al. |

* cited by examiner

METHOD AND SYSTEM FOR REDUCING EMISSIONS FROM AN INTERNAL COMBUSTION ENGINE

CROSS REFERENCE TO RELATED APPLICATIONS

This application claims the benefit under 35 U.S.C. § 119(e) of U.S. Provisional Application Ser. No. 62/174,939, filed Jun. 12, 2015. The entire contents and disclosure of the aforementioned provisional application is incorporated by reference as if fully set forth herein.

FIELD OF THE DISCLOSURE

This disclosure relates to reducing emissions from internal combustion engines coupled to after-treatment systems.

BACKGROUND

Vehicles are desired to achieve certain emission standards such as partial zero emission vehicles (PZEV) and zero emission vehicles (ZEV). In order to qualify for the PZEV or ZEV emission spikes must be avoided during a drive cycle or at start up. Spikes may be seen during a time it takes for the after-treatment system to achieve operational temperature and/or after backdriving of the internal combustion engine that sends cold air through the after-treatment system.

SUMMARY

Accordingly, disclosed is a heating system which comprises an energy storage device and a heating controller coupled to the energy storage device. The heating controller is configured to control one or more heating elements to heat one or more components of an after-treatment system using energy from the energy storage device under a first condition. The heating controller is further configured to control the heating element to stop heating the one or more components of the after-treatment system when second condition is satisfied.

The heating controller can be a thermal switch having a set temperature threshold. The thermal switch is configured to close when the temperature is at or below the temperature threshold to electrically connect the energy storage device with the heating element.

Also disclosed is a system for a hybrid vehicle. The system comprises a compressed natural gas engine, a clutch, an integrated starter/generator/motor (ISG) and a controller configured to control a clutch control assembly, the clutch and the ISG. The clutch control assembly is coupled to the clutch to engage and disengage the clutch. The ISG is coupled to the compressed natural gas engine by way of the clutch. When the controller detects an engine torque of the compressed natural gas engine to be less than or equal to a predetermined level, such that an engine would be back-driven and the temperature of at least one component of an after treatment system is equal to or below a predetermined threshold, the controller is configured to operate the clutch to disengage the compressed natural gas engine from the ISG using the clutch control assembly. The clutch is maintained in a disengaged state until a torque demand exceeds a torque threshold.

DETAILED DESCRIPTION

FIG. 1 illustrates a block diagram of a heating system coupled to an after-treatment system in accordance with aspects of the disclosure.

The heating system can be used with any type of internal combustion engine, such as, but not limited to a diesel engine, a compressed natural gas (CNG) engine or other natural gas engines. Different types of internal combustion engines have different after-treatment systems and components thereof. For example, the after-treatment system for a CNG engine includes a catalytic converter and other exhaust components. Additionally, the heating system can be used for both series and parallel drivetrains. Further, the heating system can be used for both hybrid and non-hybrid vehicles.

Figure 1A:
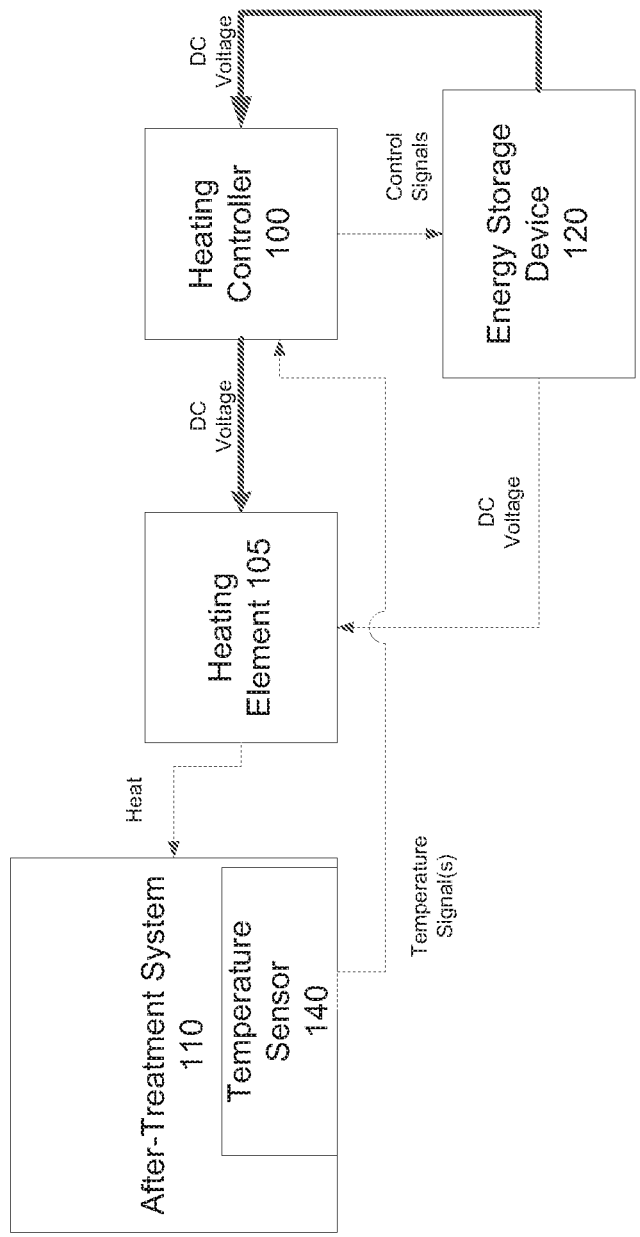
FIG. 1A illustrates a block diagram of a heating system coupled to an after-treatment system in accordance with aspects of the disclosure.

The after-treatment system for a diesel engine may use a selective catalytic reduction (SCR) exhaust system and a diesel particulate filter (DPF). The after-treatment system for a natural gas engine may use a catalytic converter and exhaust gas recirculation valve. Therefore, the after-treatment system 110 can include one or more components as depicted in FIG. 1C.

In an aspect of the disclosure, a heating controller 100 is configured to control a heating element 105 to heat one or more components of the after-treatment system 110. In an aspect of the disclosure, the heating element 105 can be integral with the after-treatment system 110. In another aspect of the disclosure, the heating element 105 can be separate from the after-treatment system 110 and positioned proximate to the after-treatment system 110 (as depicted in FIG. 1A. Additionally, a single heating element can heat the one or more components of the after-treatment system 110. Alternatively, the heating system can include multiple heating elements 105, one heating element for a corresponding one of the components (components generally referenced as 111) of the after-treatment system 110 as depicted in FIG. 1C. For example, one heating element can be coupled to the catalytic converter and another heating element can be coupled to other exhaust components.

The heating controller 100 can be a microcontroller or microprocessor or any other processing hardware such as a CPU or GPU. The microcontroller or microprocessor includes at least one data storage device, such as, but not limited to, RAM, ROM and persistent storage (not shown in the figures). In an aspect of the disclosure, the heating controller 100 can be configured to execute one or more programs stored in a computer readable storage device. The computer readable storage device can be RAM, persistent storage or removable storage. A storage device is any piece of hardware that is capable of storing information, such as, for example without limitation, data, programs, instructions, program code, and/or other suitable information, either on a temporary basis and/or a permanent basis.

In another aspect of the disclosure, an ASIC, FPGA, a PAL and PLA can be used as the heating controller 100.

Figure 1C:
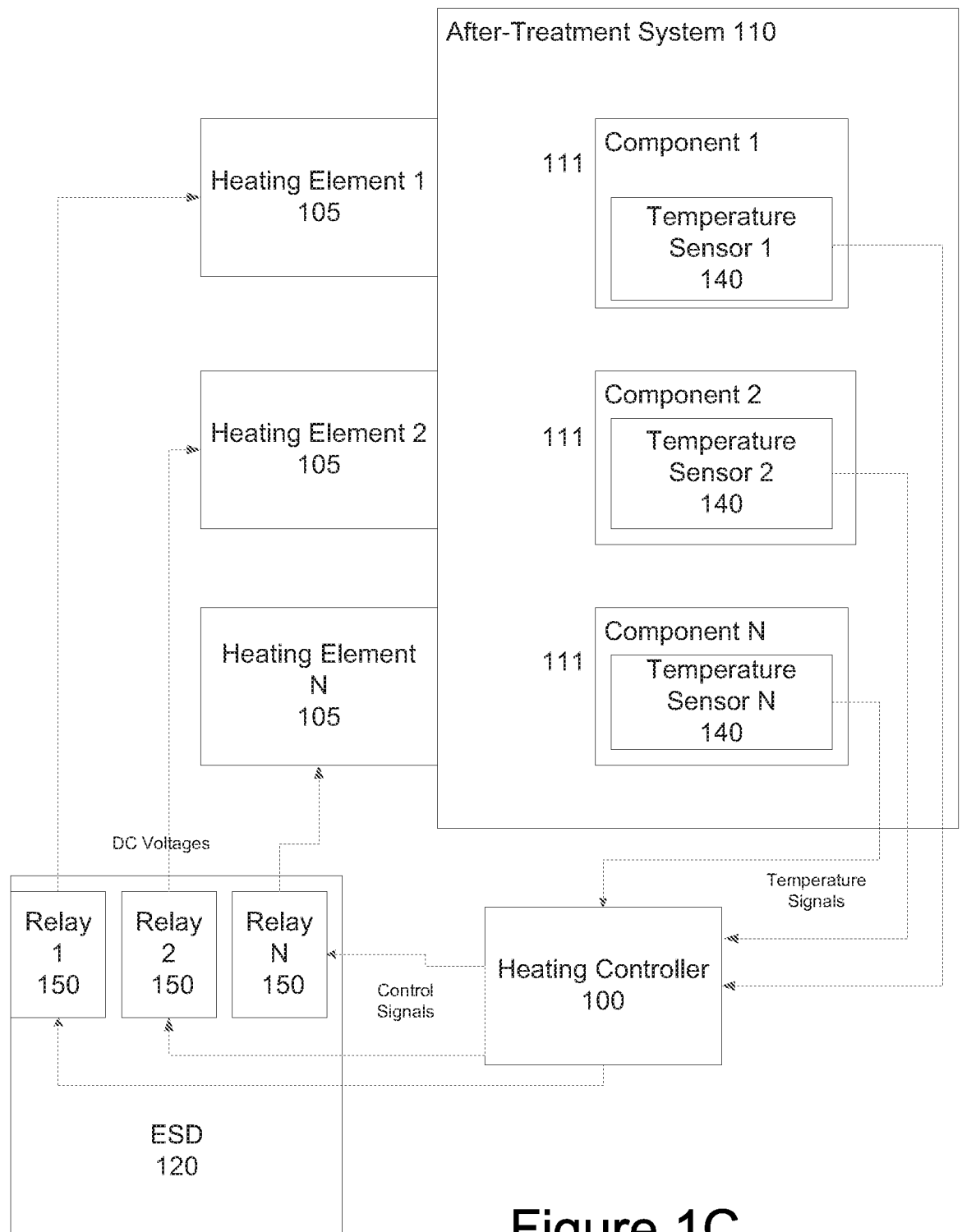
FIG. 1C illustrates another example of a heating system for an after-treatment system in accordance with aspects of the disclosure.
Figure 2:
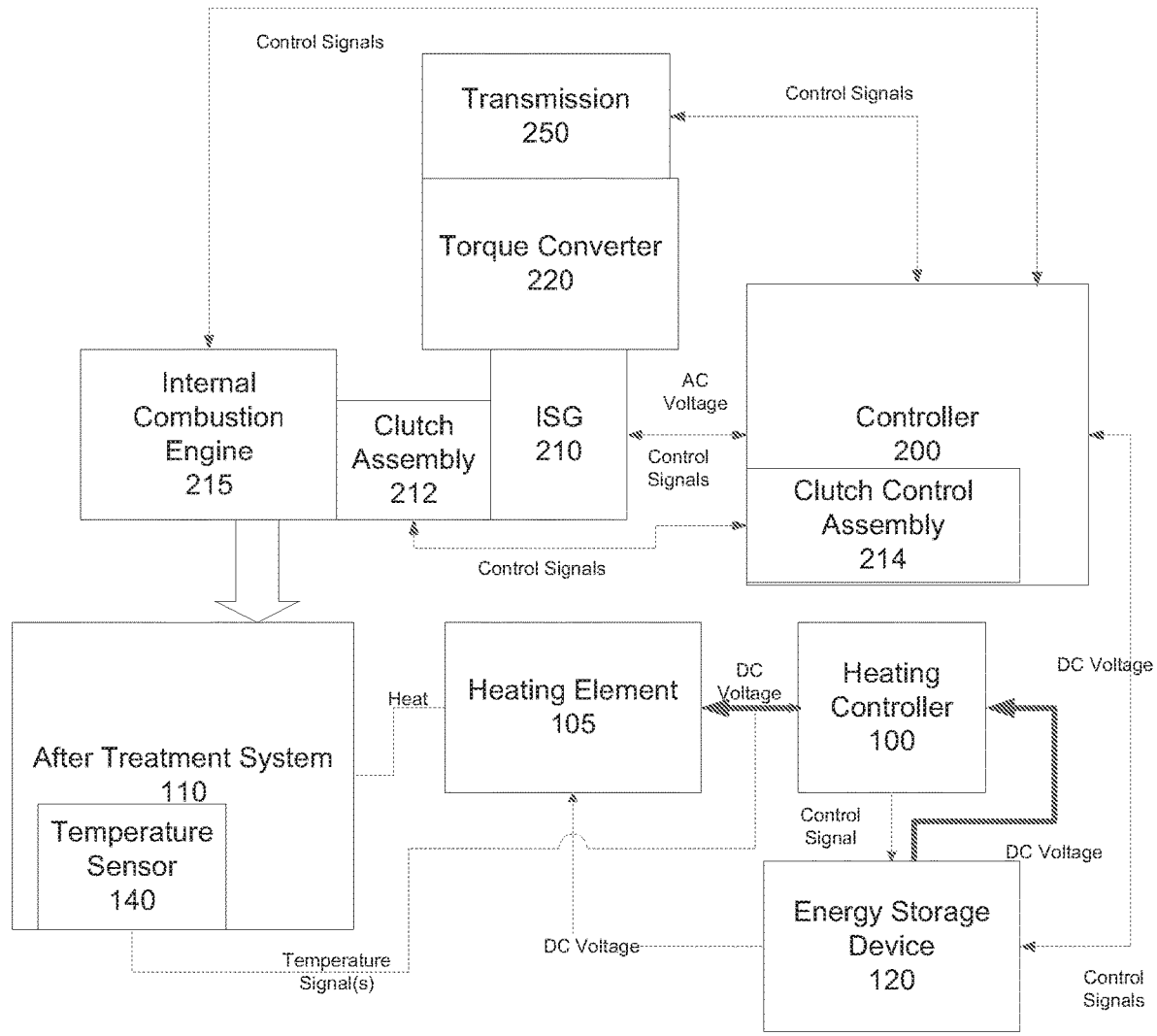
FIG. 2 illustrates a parallel hybrid system incorporating the heating system and a system for avoiding backdriving of an internal combustion engine in accordance with aspects of the disclosure.

In an aspect of the disclosure, the Controller 200, as depicted in FIG. 2, can serve as the heating controller 100. In other words, the heating controller 100 can be integrated into the Controller 200 of a vehicle, such as, but not limited to, a system control unit of a hybrid electric vehicle. The heating controller, e.g., Controller 200 can open or close a mechanical switch or relay in an Energy Storage device 120 (see, e.g., Relay 150 in FIG. 1C) or a mechanical switch between an Energy Storage Device 120 (ESD in Figures) and the heating element 105 to supply power to the heating element 105.

When there are multiple heating elements, a mechanical switch, relay 150 or thermal switch can be provided for each heating element 105. FIG. 1C illustrates Relays 150 in an Energy Storage Device 120. Each relay is coupled to one of the heating elements 105. The number of heating elements 105 and/or the number of Relays 150 are not limited. Any number can be used based on the system and the number of components 111 (shown in FIG. 1C) in the after-treatment system 110.

In another aspect of the disclosure, the Controller 200 can activate a solid state switch, such as, but not limited to, a transistor or integrated bi-polar transistor (IGBT). By controlling the on/off switching frequency, on the transistor, the heat applied by the heating elements 105 can be controlled.

Figure 1B:
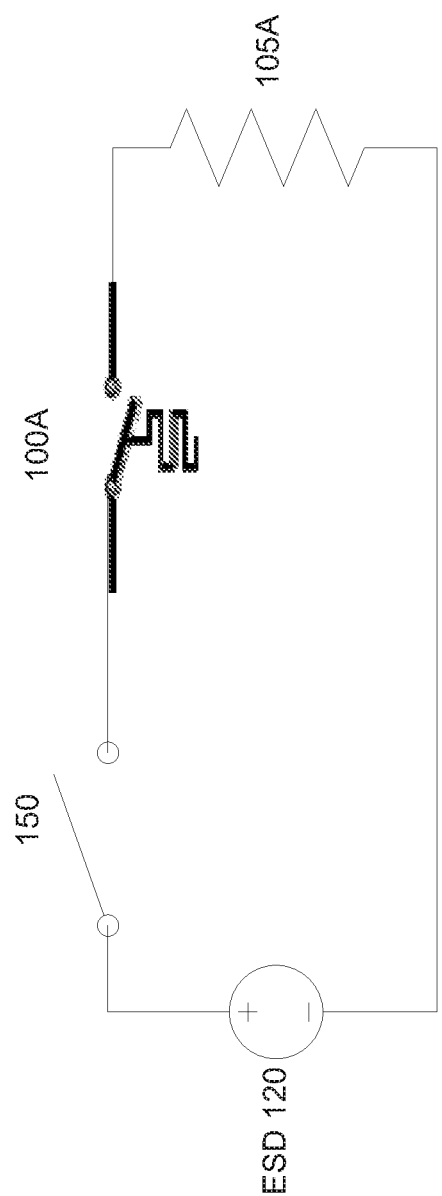
FIG. 1B illustrates an example of a heating system in accordance with aspects of the disclosure.

In yet another aspect of the disclosure, the heating controller 100 can be a switch such as a thermal switch as depicted in the example in FIG. 1B. In yet another aspect of the disclosure, a thermal switch such as one depicted in FIG. 1B can be coupled to the Controller 200. For example, when the thermal switch closes, the Controller 200 can determine whether to control a mechanical switch or relay in Energy Storage device 120 or a mechanical switch between an Energy Storage Device 120 and the heating element 105 to supply power to the heating element. The determination by the Controller 200 can be based on a state of charge (SOC) in the Energy Storage Device 120 or an operational parameter of the vehicle.

The heating controller 100 is electrically coupled to the Energy Storage Device 120. The Energy Storage Device 120 can be a battery such as a high voltage battery. For purposes of the description, a high voltage battery is a battery with a DC voltage above 48 Vdc. In an aspect of the disclosure, the Energy Storage Device 120 is a battery for a hybrid electric vehicle or a electric vehicle battery.

In one aspect of the disclosure the heating controller 100 couples a voltage from the Energy Storage Device 120 to the heating element 105 when needed to heat one or more components 111 of the after-treatment system 110. The voltage can be directly coupled from the ESD to the heating element 105 or indirectly coupled via the heating controller 100 (FIG. 1A shows both paths, where the different paths are shown by different line thicknesses). For example, the heating controller 100 can cause the ESD 120 to directly apply the DC voltage to the heating element 105 via control signals. The heating element 105 can be a resistive heating element as depicted in FIG. 1B. In another aspect of the disclosure, the heating element can be an electrochemical heating element.

In an aspect of the disclosure, the heating controller 100 controls the heating element 105 to heat one or more components of the after-treatment system 110 using energy from the Energy Storage Device 120 when needed. For example, a time when the heating is required is during a period prior to "cold start". FIG. 1B depicts an example of a circuit for heating the after-treatment system 110 during "cold start". For example, the heating controller 100 (e.g., thermal switch) receives a keyed-on signal from the ignition switch, e.g., SLI signal In an aspect of the disclosure, the heating system also includes a temperature sensor 140 (shown to output Temperature Signal(s) in the figures) coupled to, mounted to, disposed or located near the after-treatment system 110 for measuring the temperature of the after-treatment system. In a case where the after-treatment system 110 includes more than one component 111 for the after-treatment system 110, a temperature sensor 140 can be coupled to, mounted to, disposed or located near each component 111 of the after-treatment system 110 as depicted in FIG. 1C.

If the temperature of the after-treatment system 110 is below or equal to a predetermined temperature(s), (and a keyed on signal has been previously received), the heating controller 100 controls the heating element 105 to heat one or more components of the after-treatment system 110 using energy from the Energy Storage Device 120. The temperature sensor 140 can be resistive based such as a thermistor. The predetermined temperature is set for each component 111 of the after-treatment system 110 and is based, in part, on manufacture guidelines for the specific component. When there is more than one component, e.g., Component 1-N, if one of the temperature sensors, e.g., Temperature Sensor 1, indicates that the temperature is below or equal to a predetermined temperature, the heating controller 100 closes a corresponding mechanical switch or relay, e.g., Relay 1 associated with the heating element 105 (Heating Element 1) by issuing control signal(s). In another aspect of the disclosure, if one of the temperature sensors (using temperature signal(s)), e.g., Temperature Sensor 1, indicates that the temperature (around the component 1) is below or equal to its corresponding threshold, the heating controller 100 can couple power from the Energy Storage Device 120 via, e.g., Relays 1-N, to each of the heating elements 105 (Heating elements 1-N) for all of the components (1-N) of the after-treatment system 110. If the temperature of the after-treatment system 110 is above the predetermined temperature, the heating controller 100 does not cause the heating element 105 to heat the after-treatment system 110. Although the disclosed heating system will be typically used when starting the vehicle, e.g., when a keyed on signal is received, the heating system can also be used any time when the temperature is sensed to be below the predetermined temperature.

In another aspect of the disclosure, the heating of one or more components 111 of the after-treatment system 110 can be triggered indirectly. For example, if the heating controller 100 determines that glow plugs for the engine is activated or an intake air heater function is activated, the heating controller 100 controls the heating element 105 to heat one or more components of the after-treatment system 110.

FIG. 1B illustrates an example of a heating system in accordance with aspects of the disclosure. FIG. 1B depicts an ESD 120 coupled to a switch 150. The switch 150 functions as a keyed on switch configured to close when the ignition is turned to keyed on. The switch 150 is connected to a thermal switch 100A. As depicted, the thermal switch 100A acts as the heating controller 100. The thermal switch 100A is set to the predetermined temperature. The thermal switch 100A can be mounted on or near one or more components 111 of the after-treatment system 110. When there is more than one component, a separate thermal switch 100A can be mounted to or near each of the more than one component 111. The thermal switch 100A can be of a normally open, resettable type. In other words, the thermal switch 100A is configured to close when the temperature is reached, e.g., below or equal to its set point. When, the temperature returns to above the set point, the thermal switch 100A reopens. Therefore, the resistive heating element 105A is electrically isolated from or electrically coupled to the ESD 120, when the thermal switch 100A reopens.

Each thermal switch 100A can be set to a different trigger or close temperature. The thermal switch 100A is coupled to a resistive heating element 105A. When both switch 150 and thermal switch 100A are closed, power from the ESD 120 is supplied to the resistive heating element 105A which heats one or more component 111 of the after-treatment system 110.

When there are more than one thermal switches 100A, each thermal switch can be connected in parallel to the switch 150.

In an aspect of the disclosure, when using the heating system prior to "cold start", by heating one or more components 111 of the after-treatment system 110 prior to cold start, initial emissions are minimized.

The heating controller 100 controls the heating elements 105 to stop heating one or more components of the after-treatment system 110 when a predetermined condition is reached. The predetermined condition can be a set temperature for the after-treatment system 110 or a preset heat time. The set temperature can be the same temperature as the predetermined temperature to start heating the one or more components. The set temperature can be different for each heating element of a multi-heating element system.

In the case of the heating system depicted in FIG. 1B, when the temperature sensed by the thermal switch 100A exceeds the temperature set point, the thermal switch 100A will open, isolating the Energy Storage Device 120 from the resistive heating element 105A.

In another aspect of the disclosure, a look up table (stored in a memory, not shown in the Figures) can be used to determine the heating time. The look up table can include measured or detected temperature (ambient and/or after-treatment) and associated heating time. The colder the ambient and/or after-treatment temperature is, the longer the heating element 105 heats the one or more components 111 of the after-treatment system 110.

Additionally, the control of the heating element 105 can be based on a state of charge (SOC) of the Energy Storage Device 120. For example, if the SOC of the Energy Storage Device 120 is below of specific percentage, the heating controller 100, even though the sensed temperature by the temperature sensor is below or equal to the predetermined temperature, the heating controller 100 may not activate the heating element 105.

In another aspect of the disclosure, the heating controller 100 can control the heating element 105 to gradually heating one or more components 111 of the after-treatment system 110 by controlling the magnitude of the power supplied to a heating element 105. For example, for each component 111 of the after-treatment system 110, instead of having a single predetermined temperature where the heating element 105 is activated, e.g., OFF or ON, there are multiple predetermined temperatures. Each predetermined temperature is associated with a preset power level for heating. In an aspect of the disclosure, the heating controller 100 can control the power level by adjusting the duty cycle of the mechanical switches or relays, e.g., switching speed. For example, if there are two predetermined temperatures, a first predetermined temperature and a second predetermined temperature where the first is lower than the second, the power level for the second predetermined temperature is set to be lower than the power level for the first predetermined temperature. Accordingly, in the lower power level, the "ON" period in the duty cycle for the mechanical switch or relay is shorter than the "ON" period in the duty cycle for the higher power level.

In another aspect of the disclosure, instead of powering the heating element 105 at a predetermined temperature, the heating controller 100 can control the heating element 105 to activate, e.g., provide power, when a change in the temperature sensed by a temperature sensor 140, e.g., Δt, for a component 111 of the after treatment system 110 is greater than a predetermined threshold.

In another aspect of the disclosure, backdriving of an internal combustion engine 215, such as a compressed natural gas engine (FIG. 2) is avoided. For a parallel drivetrain, backdriving of an engine is when the torque imparted to the driveline from the wheels by the vehicle momentum exceeds the torque demanded by the driver and the amount required to maintain the rotation of the engine. One example of backdriving is after a lift throttle event. The lift throttle event is where the torque demand is reduced or removed by the driver and/or controller on the internal combustion engine 215 or ISG 210.

The powertrain system in accordance with aspects of the disclosure includes an internal combustion engine 215 (also referred to herein as "engine") such as a compressed natural gas engine (CNG Engine) coupled to an integrated starter/generator/motor (ISG) 210 by way of a clutch assembly 212. The clutch assembly 212 allows the ISG 210 to be disengaged from the internal combustion engine 215. The clutch assembly 212 is controlled by a clutch control assembly 214 in the controller 200 (shown in the figures by "control signals"). The clutch control assembly 214 is for example, a hydraulic solenoid controlling engagement and disengagement of the clutch assembly 212 based on the state of a hybrid vehicle. Additionally, the clutch control assembly 214 can be pneumatic or mechanical. The ISG is coupled to the Transmission 250 via a torque converter 220. The Controller 200 and the Transmission 250 have bi-directional communication, e.g., control signals. The Transmission 250 sends state information to the Controller 220.

In an aspect of the disclosure, to avoid backdriving the internal combustion engine 215, the clutch assembly 212 disengages the engine 215 from the ISG 210. In another aspect of the disclosure fuel can be removed from the engine when one or more conditions are detected.

For example, a condition can be a negative engine torque. A negative torque on the engine can be detected when a driver lifts the throttle and the vehicle speed is non-zero. Another condition can be when fuel is removed from the internal combustion engine by the engine controller (not shown). In another aspect of the disclosure, the condition is a measured torque on the ISG 210. More specifically, the condition is when the torque generated by the ISG is determined to be opposite from what is required to drive the vehicle, e.g., a different sign.

The fuel can be first removed from the engine 215 and then subsequently, the Controller 200 disengages the engine 215 from the ISG 210 by controlling the clutch via a clutch assembly 212. In another aspect of the disclosure, the Controller 200 first disengages the engine 215 from the ISG 210 by controlling the clutch via a clutch assembly 212 and then fuel can be removed from the engine 215. In yet another aspect of the disclosure, removing fuel from the engine and disengaging the engine 215 from the ISG 210 by controlling the clutch via a clutch assembly 212 occurs simultaneously.

Additionally, in an aspect of the disclosure, a predetermined time period is waited between removing the fuel from the engine and the Controller 200 disengaging the engine 215 from the ISG 210 by controlling the clutch via a clutch assembly 212 or vice versa.

In another aspect of the disclosure, the Controller 200 only disengages the engine 215, during a backdriving event, from the ISG 210 by controlling the clutch via a clutch assembly 212 if a temperature of the after-treatment system 110 (e.g., one or more components thereof) is sensed by a temperature sensor, e.g., temperature sensor 140, to be below or equal to a predetermined temperature.

In another aspect of the disclosure, the Controller 200 only disengages the engine 215 during a backdriving event, from the ISG 210 by controlling the clutch via a clutch assembly 212 if the heating element 105 cannot heat the after-treatment system 110 (e.g., one or more components thereof) to above another predetermined temperature. In another aspect of the disclosure, the Controller always disengages the engine 215, during a backdriving event, from the ISG.

Figure 4:
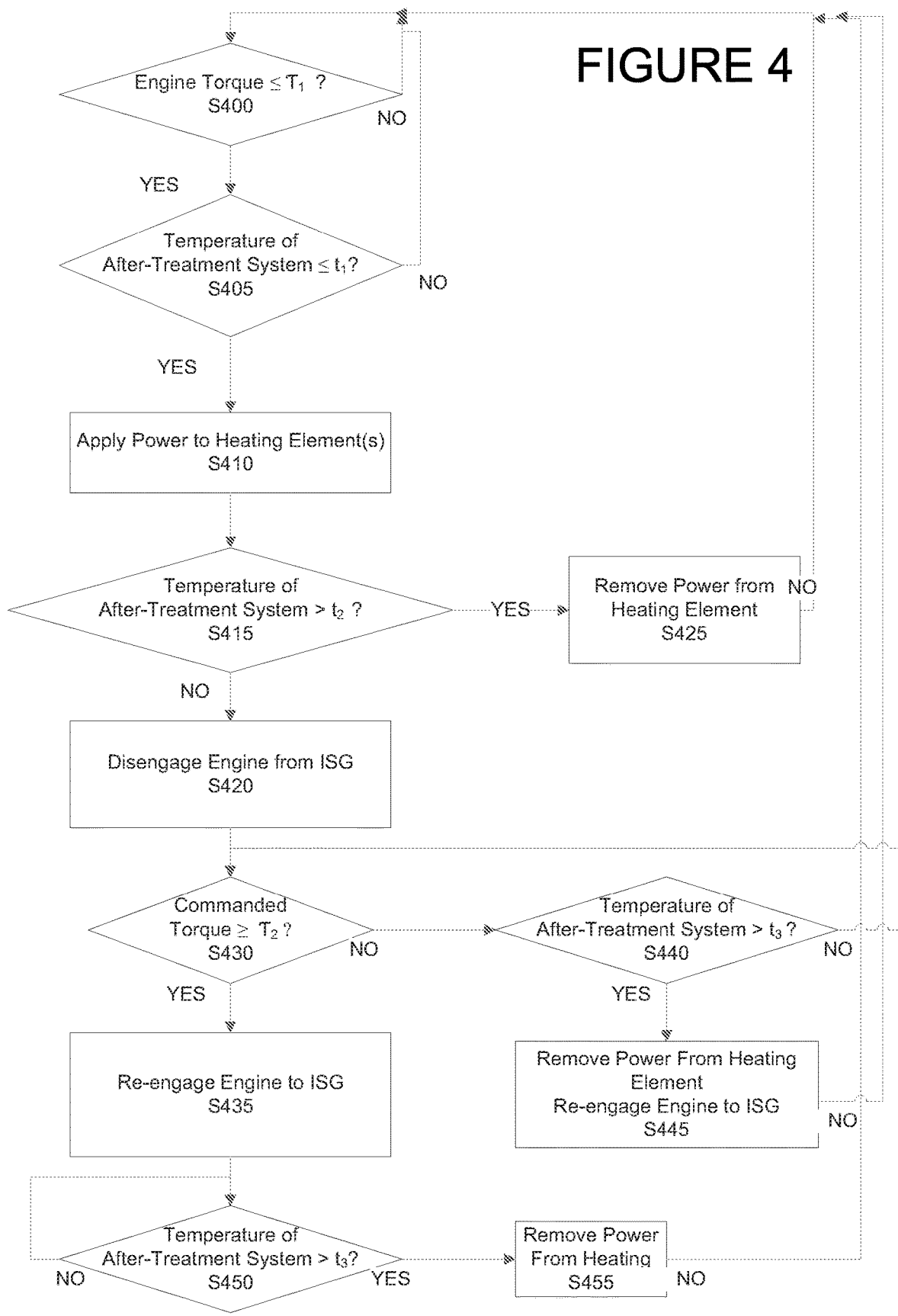
FIG. 4 illustrates an example of a method for reducing emissions according to aspects of the disclosure for a parallel drivetrain system.

FIG. 4 illustrates an example of a method for reducing emissions according to aspects of the disclosure for a parallel drivetrain system. At S400, the Controller 200 determines if an engine torque is below to a predetermined torque $T_1$. For example, the Controller 200 monitors signals from the vehicle interface such as the throttle. If the drive lifts the throttle, the driver has commanded zero torque, while the vehicle is still moving. There are other ways that an engine be can backdriving in a hybrid system. For example, the engine 215 can act as a load for the system. Further, the Controller 200 can command a negative torque from the ISG 210 as required.

If at S400, the Controller 200 determines that the engine torque is below or equal to a predetermined torque $T_1$, ("YES"), the heating controller 100 then evaluates the temperature of the after-treatment system at S405. In an aspect of the disclosure, the Controller 200, upon determining engine torque below or equal to a predetermined torque $T_1$, sends a signal to the heating controller 100. In another aspect of the disclosure, the heating controller 100 is incorporated in the Controller 200. The heating controller 100 receives sensed temperature readings from the temperature sensors 140 associated with the component(s) 111 of the after-treatment system 110 as described above. In an aspect of the disclosure, a predetermined temperature $t_1$ is prestored in memory. The heating controller 100 compares the predetermined temperature $t_1$ with the received sensed temperature (temperature signals). If the sensed temperature of the after-treatment system is less than or equal to the predetermined temperature $t_1$ ("YES" at S405), the heating controller 100 activates the heating element 105 at S410. For example, the heating controller 100 controls a mechanical switch or relay to close. FIG. 2 also shows two different paths for the DC voltage to reach the heating element 105. The activation of the heating element is described above and will not be described in detail again. In an aspect of the disclosure, the heating controller 100 can send a signal to the Controller 200 indicating that the heating element 105 is ON. If after the heating element 105 is activated and heating the after-treatment system 110, the after-treatment system is still too cold, e.g., below or equal to another predetermined temperature $t_2$, the engine 215 can be disengaged from the ISG 210. At S415, the Controller 200 and/or heating controller 100 determines if the sensed temperature received from the temperature sensor 140 is above another predetermined temperature $t_2$. In an aspect of the disclosure, a predetermined temperature $t_2$ is prestored in memory. $t_1$ and $t_2$ may be the same temperature. However, in another aspect of the disclosure, $t_2$ is lower than $t_1$. If the temperature of the after-treatment system is less than or equal to $t_2$ ("NO" at S415), the Controller 200 disengages the engine 215 from the ISG 210 by controlling the clutch via a clutch assembly 212 at S420. Further, the engine controller (not shown) causes the internal combustion engine 215 to either shut off or idle. For example, when the driver does not command a torque, e.g., lift throttle (and the engine is not backdriven), the engine controller reduces the governed idle speed.

If at S415, the temperature of the after-treatment system is greater than $t_2$, the heating element 105 is deactivated and power is removed at S425. For example, the heating controller 100 opens a mechanical switch or relay as described above.

After the engine 215 is disengaged from the ISG 210, the Controller 200 continuously monitors the vehicle interfaces, e.g., throttle and other ISG 210 and engine 215 conditions (shown as "control signals" in FIG. 2) to determine if a torque command has been received or changed (S430). When the Controller 200 determines that an engine torque is required above or equal to a second predetermined level $T_2$ ("YES") at S430, the Controller 200 engages the engine 215 to the ISG 210 at S435. Torque is determined by evaluating the throttle position, which is translated from a pedal position or degree of travel to an equivalent torque request. At this time, the heating element 105 remains active. The heating controller 100 (or controller 200) then continues to monitor the temperature of the after-treatment 110 and once the temperature of the after-treatment exceeds $t_3$ (YES) at S450, the heating controller (100) removes power to the heating element (105) at S455. In an aspect of the disclosure $t_3$ is different than $t_1$ and $t_2$. In another aspect of the disclosure $t_3$ is the same as $t_2$. FIG. 2 shows the temperature signals being input into the heating controller 100. When the heating controller 100 is incorporated in the Controller 200, the temperature signals are input to the controller 200.

Also, after the engine 215 is disengaged from the ISG 210, the Controller 200 and/or the heating controller 100 monitors the temperature of the after-treatment system S440, based on sensed temperature values from the temperature sensor 140 (and also where the engine torque is below a second predetermined level $T_2$). The Controller 200 and/or the heating controller 100 compares the sensed temperature with the predetermined temperature $t_3$ If the sensed temperature is greater than the predetermined temperature $t_3$ ("YES" at S440), the Controller 200 and/or the heating controller 100 engages the engine 215 to the ISG 210 and deactivates the heating element 105 by removing power therefrom (S445).

If the sensed temperature is less than or equal to the predetermined temperature $T_3$ ("NO" at S440), the Controller 200 returns to S430. If the sensed temperature is greater than the predetermined temperature $t_3$, the engine 215, is re-engaged to the ISG 210 (S445), and the heating controller 100, e.g., Controller 200, deactivates the heating element 105.

Figure 5:
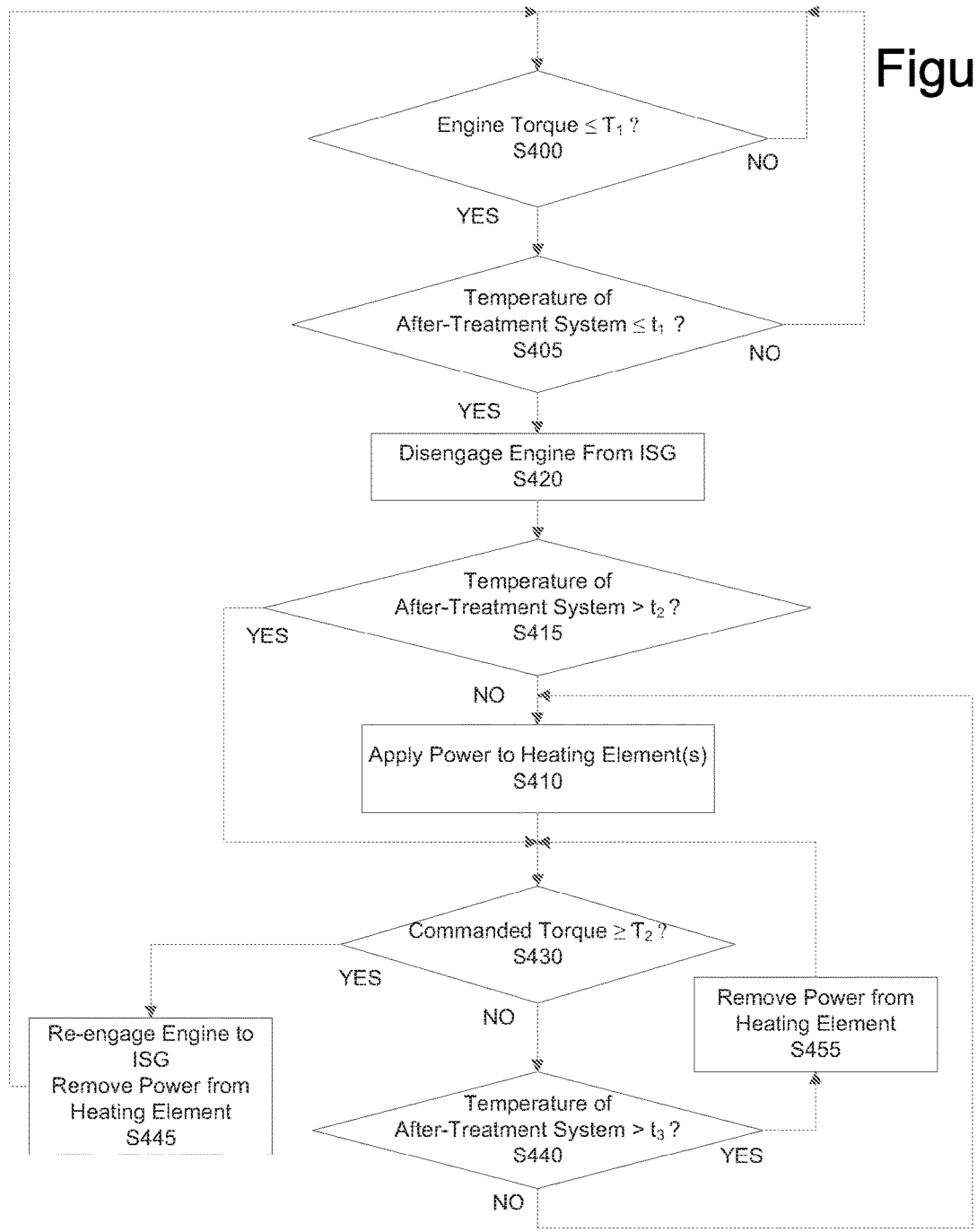
FIG. 5 illustrates another example of a method for reducing emissions according to aspects of the disclosure for a parallel drivetrain system.

In another aspect of the disclosure, the engine 215 can be disengaged from the ISG 210 prior to activating the heating element 105. FIG. 5 shows an example of a method for reducing emissions according to aspects of the disclosure for a parallel drivetrain system where the engine 215 is disengaged from the ISG 210 prior to activating the heating element 105. The steps of the method are similar to the steps depicted in FIG. 4, however, the order is changed and certain steps are eliminated. For example, S420 now is before S410. Additionally, if when the engine 215 is disengaged from the ISG 210, the temperature is controlled, e.g., above $t_2$, there is no need to activate the heating element 110 and power is saved.

Since backdriving the internal combustion engine 215 is avoided, the rate of cooling of the after-treatment 110 (e.g., cooling of components thereof) is reduced. Spikes in the level of emissions are avoided. In FIG. 2, the direction of exhaust flows from the internal combustion engine 215 to the after-treatment system 110 as reflected by the arrow.

For descriptive purposes, FIG. 2 does not show certain power components such as an inverter. However, the inverter can be separate or be integrated within the Controller 200. As shown, the inverter would be included in the Controller 200, which is why the AC voltage is output from Controller 200 and the DC voltage from the ESD 120 is input into the Controller 200.

Figure 3:
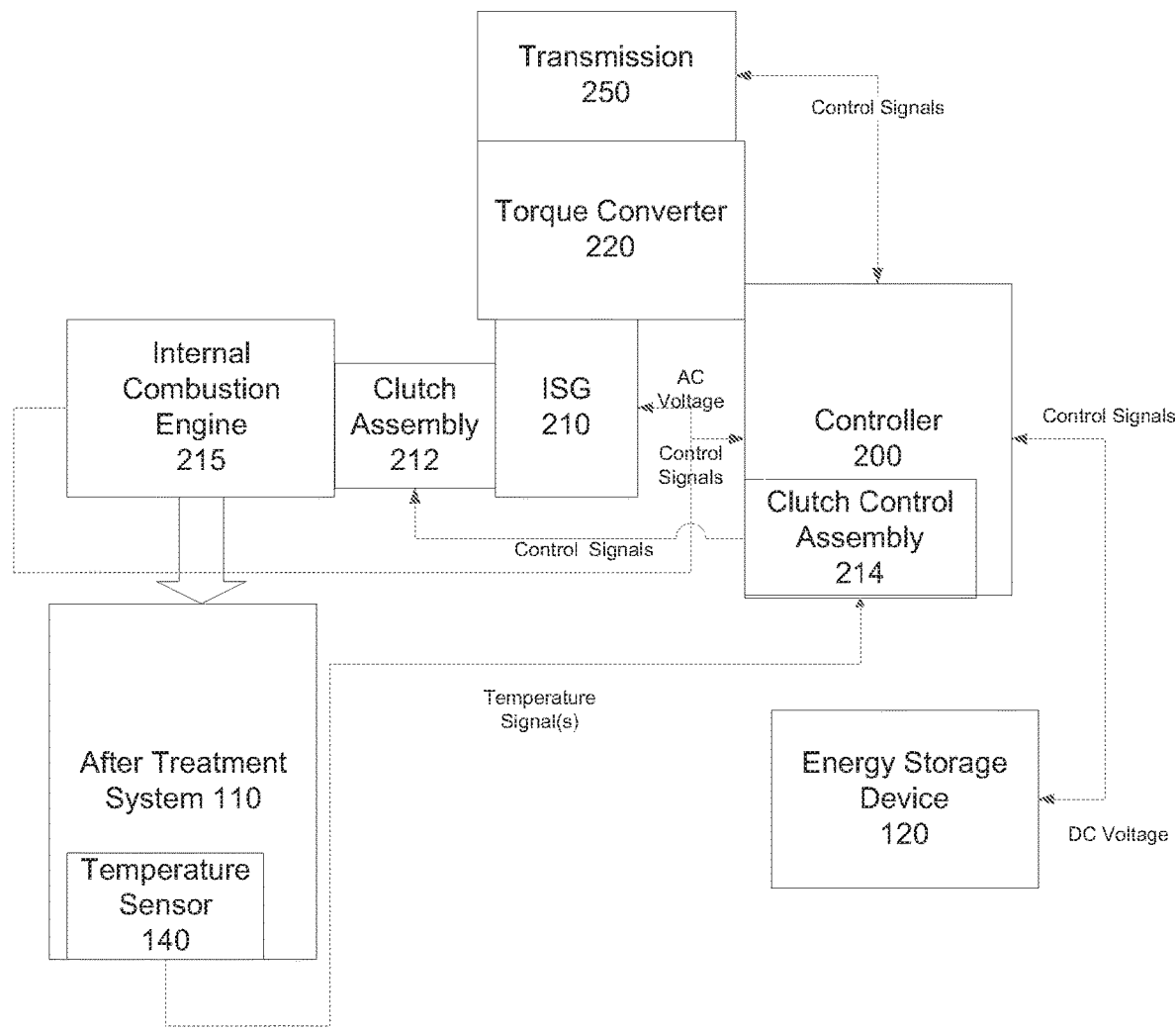
FIG. 3 illustrates a parallel hybrid system incorporating a system for avoiding backdriving or idling of an internal combustion engine in accordance with aspects of the disclosure.

FIG. 2 depicts both the heating element 105 and heating controller 100 and a system for avoiding backdriving of the internal combustion engine 215 to reduce emission. However, the heating element 105 and heating controller 100 can be separately used to reduce emissions without using the system for avoiding backdriving of the internal combustion engine 215. Additionally, the system for avoiding backdriving of the internal combustion engine 215 can be used without the heating element 105 and heating controller 100 to reduce emissions as depicted in FIG. 3.

Figure 6:
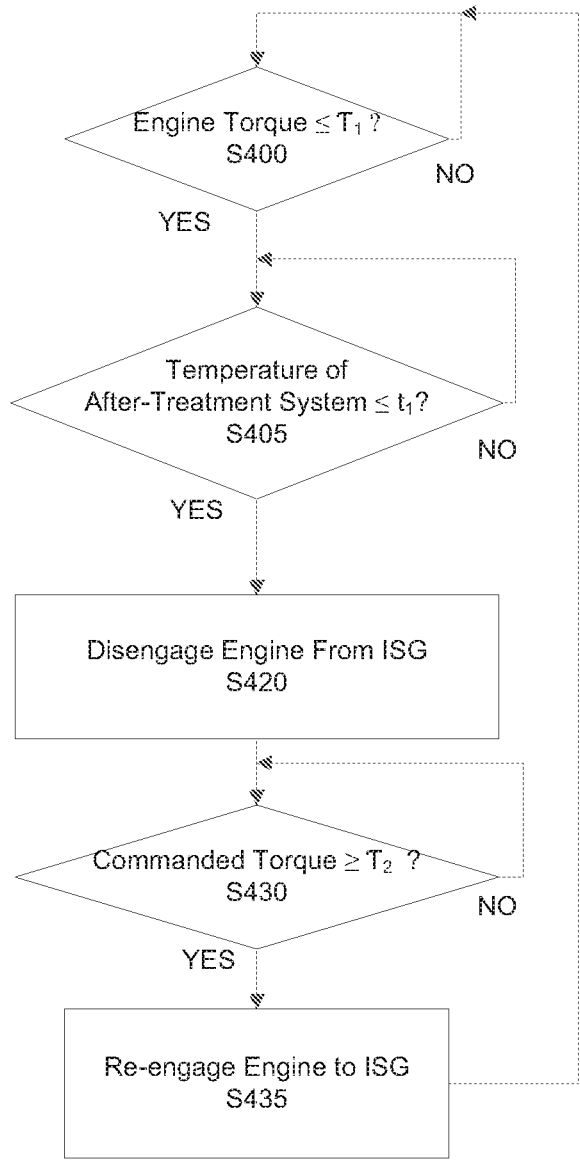
FIG. 6 illustrates another example of a method for reducing emissions according to aspects of the disclosure for a parallel drivetrain system.

FIG. 6 depicts an example of a method for emissions according to aspects of the disclosure for a parallel drivetrain system without a heating element. Many of the steps of the method are the same as in FIGS. 4 and 5 and thus will not be described again in detail. As seen in FIG. 6, S410, S415, S425, S440, S445, S450 and S455 are omitted. In FIG. 6, if the temperature of the after-treatment system is below or equal to a predetermined temperature $t_1$ ("YES" at S405), the Controller 200 disengages the engine 215 from the ISG 210 (S420). The engine 215 is re-engaged to the ISG 210 when the commanded torque is greater than a second predetermined torque $T_2$ ("YES" at S430); otherwise, the engine 215 is maintained to be isolated from the ISG 210.

Figure 7:
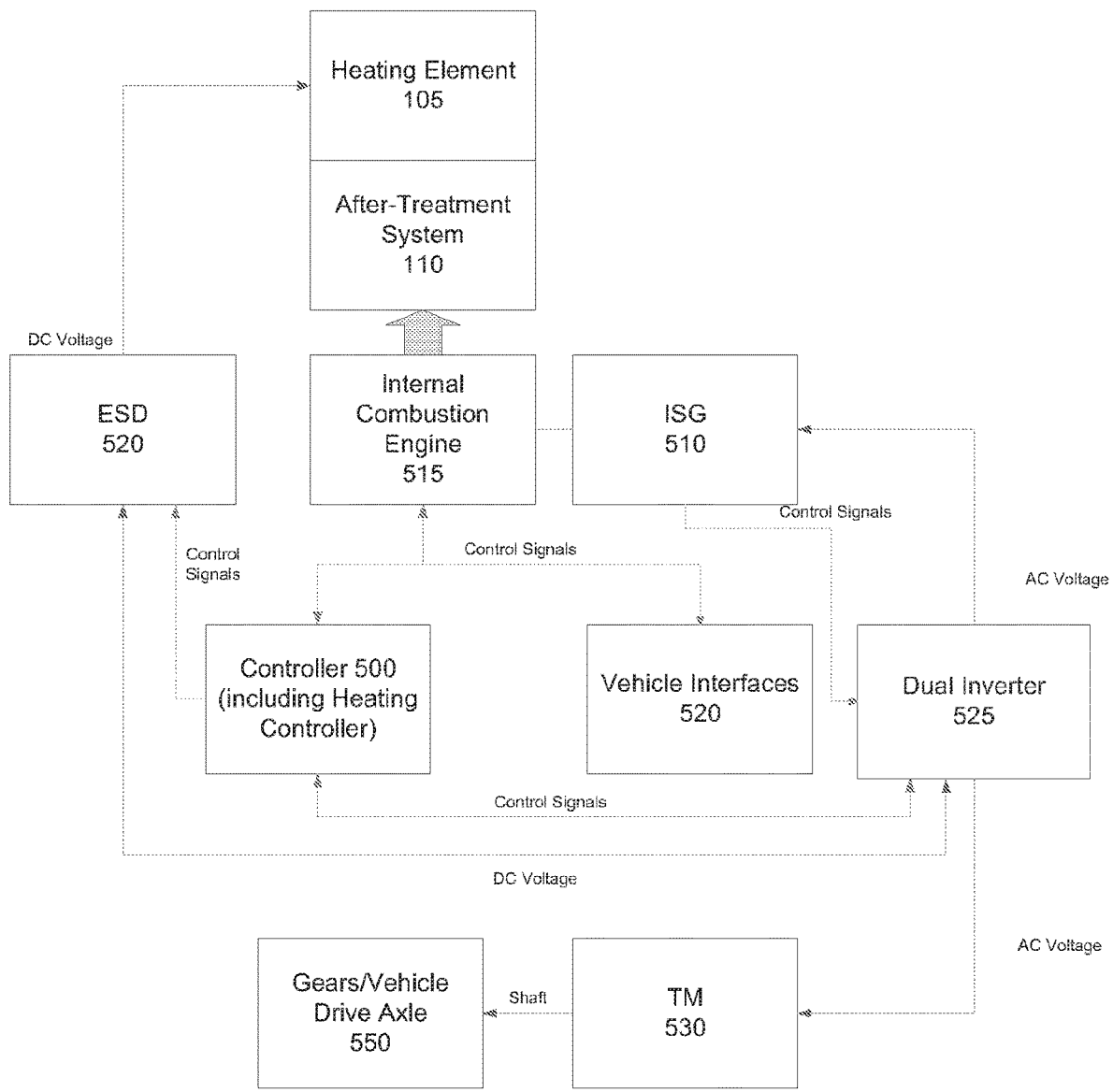
FIG. 7 illustrates a series hybrid system incorporating a heating system in accordance with aspects of the disclosure.

As noted above, the heating system described herein can be used in either a parallel or series drivetrain. FIG. 7 illustrates a series hybrid system incorporating a heating system in according with aspects of the disclosure. As depicted in FIG. 7, the internal combustion engine 515 is coupled to the ISG 510 without a clutch.

FIG. 7 illustrates a series hybrid system incorporating a heating system in according with aspects of the disclosure. In a series hybrid system, the Internal Combustion Engine 515 is directly coupled to the ISG 510 unlike the parallel system where there is a clutch between the two. Similar to a parallel system, an After-Treatment System 110 is disposed near the Internal Combustion Engine 515. In an aspect of the disclosure, one or more temperature sensors 140 are coupled to, mounted to, disposed or located near one or more components 111 of the After-Treatment System 110. The temperature sensor 140 senses temperature of the associated component of the After-Treatment System 110. Similar to described above, one or more heating elements 105 are positioned proximate to the one or more components of the After-Treatment System to heat the components as needed based on the control from the Controller 500 or heating controller.

The Series hybrid system also includes an Energy Storage Device 520. The Energy Storage Device 520 supplies a DC voltage. A dual power inverter 525 converts the DC voltage to AC voltage (and vice versa) for both the ISG 510 and the Traction Motor 530. The inverter can be separate from the Controller 500 or integrated within. As depicted in FIG. 7, the Dual Inverter 525 is separate from the Controller 500. The Dual Inverter 525 is electrically coupled to both the ISG 510 and the Traction Motor 530. However, in another aspect of the disclosure, a separate inverter is used for each of the ISG 510 and the Traction Motor 530. As with the Energy Storage Device 120 described above, the Energy Storage Device 520 includes one or more mechanical switches or relays which can be opened or closed under the control of the Controller 500 or heating controller. The heating controller controls the heating element. The heating controller can be separate from the Controller 500. Alternatively, the heating controller is integrated into the Controller 500. In FIG. 7, the heating controller is depicted in the Controller 500, however, for the purposes of the description, the heating controller will be described separately.

The Traction Motor 530 is connected with the Gears/Vehicle Drive Axle(s) 550 of the vehicle to propel the vehicle via a shaft. The Controller 500 is in electrical communication with Vehicle Interfaces 520, such as, but not limited to the throttle and brake pedal.

Additionally, the Controller 500 is configured to determine the required torque commands for the Internal Combustion Engine 515, ISG 510 and the Traction Motor 530.

For a series hybrid system, when a negative torque command is received from the Controller, e.g., a lift throttle event, the Controller 500 may backdrive the Internal Combustion Engine 515 to provide an electrical load for the power created by the Traction Motor 530, which is used to slow the vehicle down, without having to brake. The Internal Combustion Engine 515 acts a load for the ISG 510. However, since the Internal Combustion Engine 515 is being backdriven, un-combusted air is forced into the After-Treatment system 110, which has a cooling effect on the components of the after-treatment system. In accordance with aspects of the disclosure, when the Controller 500 commands the ISG inverter (of the Dual Inverter 525) to backdrive the Internal Combustion Engine 515, the heating controller activates the heating element 105 to heat the After-Treatment System 110. The activation of the heating element 105 is described above and will not be described again in detail. As shown in FIG. 7, the DC voltage is supplied directly to the heating element 105 based on control signals from the Controller 500, however, the DC voltage as be supplied by the dual inverter 525.

The heating element remains "ON" until, the Controller 500 stops commanding the backdriving of the Internal Combustion Engine by the ISG 510.

In another aspect of the disclosure, the heating controller may only activate the heating element 105 if the temperature sensor (not shown in FIG. 7) sensed a temperature of one or more components of the After-Treatment System 110 to be less than (e.g., below) or equal to a predetermined temperature. In another aspect of the disclosure, the heating element 105 only remains on until a second predetermined temperature is reached.

In another aspect of the disclosure, the heating element 105 can be used separately from counteracting the back-driving of the Internal Combustion Engine 515. For example, any time the temperature of one or more components of the After-Treatment System is less than or equal to a predetermined temperature, the heating controller can activate the heating element 105.

In an aspect of the disclosure, the internal combustion engine 215 is a compressed natural gas (CNG) engine. However, the disclosure is not limited to the CNG engine. But rather is applicable to any engine having an after-treatment system that is needed to be at or above a temperature to be effective.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device, may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electro-magnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The terms "heating controller" as may be used in the present disclosure may include a variety of combinations of fixed and/or portable computer hardware, software, peripherals, and storage devices. The Controller and/or Control System may include a plurality of individual components that are networked or otherwise linked to perform collaboratively, or may include one or more stand-alone components.

The terminology used herein is for the purpose of describing particular embodiments only and is not intended to be limiting the scope of the disclosure and is not intended to be exhaustive. Many modifications and variations will be apparent to those of ordinary skill in the art without departing from the scope and spirit of the disclosure.

What is claimed is:

1. A heating system comprising:
an energy storage device; and
a heating controller coupled to the energy storage device, the heating controller configured to control a heating element to heat each one of a plurality of components of an after-treatment system using energy from the energy storage device under a first condition and to control the heating element to stop heating each one of the plurality of components of the after-treatment system when a second condition is satisfied,
wherein the heating controller is a thermal switch having a temperature threshold, the thermal switch being configured to close when the temperature is at or below the temperature threshold to electrically connect the energy storage device with the heating element.

2. The heating system according to claim 1, wherein the first condition is selected from a group consisting of a receipt of an engine start signal, an engine wait to start signal and a request to start signal.

3. The heating system according to claim 1, wherein the heating controller receives a sensed temperature from a temperature sensor coupled to the after-treatment system.

4. The heating system according to claim 3, wherein the first condition is the sensed temperature of the after-treatment system less than or equal to a first predetermined threshold after receiving an engine start signal.

5. The heating system according to claim 1, wherein the heating controller receives a sensed temperature from a temperature sensor coupled to at least one component of the plurality of components, and wherein the heating element comprises a plurality of heating elements, where one heating element is provided for each one of the plurality of components.

6. The heating system according to claim 5, wherein when the heating controller receives the sensed temperature from the temperature sensor less than or equal to a first predetermined threshold, the heating controller controls the heating element associated with the respective component of the plurality of components that corresponds to the temperature sensor less than or equal to the first predetermined threshold to heat the component.

7. The heating system according to claim 5, wherein when the heating controller receives the sensed temperature from the temperature sensor less than or equal to a first predetermined threshold, the heating controller controls the plurality of heating elements to heat the respective component of the plurality of components.

8. The heating system according to claim 1, wherein the second condition is a predetermined period of time after controlling the heating element to start heating each one of the plurality of components of the after-treatment system.

9. The heating system according to claim 1, wherein the second condition is based on a temperature of the after-treatment system.

10. The heating system according to claim 4, wherein the heating controller is configured to control a level of heat based on the sensed temperature received from the temperature sensor, wherein the heating controller supplies a first power level to the heating element when the sensed temperature is between the first predetermined threshold and a second predetermined threshold and supplies a second power level to the heating element when the sensed temperature is below the second predetermined threshold, the second power level is greater than the first power level, the second predetermined threshold is lower than the first predetermined threshold.

11. The heating system according to claim 1, wherein the heating controller is configured to monitor a master event and when the master event occurs, control the heating element to heat the one or more components of the after-treatment system.

12. An engine after-treatment heating system comprising:
a normally open thermal switch having a first terminal electrically coupled to a power supply, the normally open thermal switch has a preset temperature trigger at or below which the normally open thermal switch closes; and
a resistive heating element, the resistive heating element is coupled to a second terminal of the normally open thermal switch, wherein when the normally open thermal switch closes, power is supplied from the power supply to the resistive heating element causing the resistive heating element to heat each one of a plurality of components of an after-treatment system.

13. The engine after-treatment heating system of claim 12, wherein the normally open thermal switch is resettable and wherein when a temperature increases to above the preset temperature due to the resistive heating element heating each one of the plurality of components of the after-treatment system, the normally open thermal switch opens, electrical isolating the power supply from the resistive heating element.

14. The engine after-treatment heating system of claim 12, further comprising a switch coupled to an ignition switch, a first terminal of the switch is coupled to the power supply and a second terminal of the switch is coupled to the normally open thermal switch, the switch is configured to be normally open, wherein when the switch receives a signal from the ignition switch, the switch closes, electrical coupling the power supply to the normally open thermal switch.

15. The heating system according to claim 1, wherein the energy storage device is a high voltage battery for a hybrid electric vehicle or an electric vehicle.

16. The engine after-treatment heating system of claim 12, wherein the after-treatment heating system is on a vehicle comprising a compressed natural gas engine, clutch assembly, and an integrated starter/generator/motor, wherein the clutch assembly is configured to disengage from the internal combustion engine to avoid backdriving the compressed natural gas engine.

* * * * *